United States Patent [19]

Muller et al.

[11] 3,836,722

[45] Sept. 17, 1974

[54] SYNCHRONIZING METHOD IN TIME-DIVISION MULTIPLEX TRANSMISSION SYSTEMS

[75] Inventors: Henrik Muller; Peter Weidner, both of Munich, Germany

[73] Assignee: Siemens Aktiengesellschaft, Postfach, Germany

[22] Filed: Apr. 17, 1973

[21] Appl. No.: 351,973

[30] Foreign Application Priority Data

May 3, 1972 Germany............................ 2221629

[52] U.S. Cl........................... 179/15 BS, 178/69.5 R

[51] Int. Cl............................................... H04j 3/06

[58] Field of Search............. 178/69.5 R; 179/15 BS

[56] References Cited

UNITED STATES PATENTS 3,742,139 6/1973 Boehly.......................... 178/69.5 R 3,758,722 9/1973 Bonyhard.................... 179/15 BS

*Primary Examiner*—Ralph D. Blakeslee

*Attorney, Agent, or Firm*—Schuyler, Birch, Swindler, McKie & Beckett

[57] ABSTRACT

A method for synchronizing transmitting and receiving exchange stations is disclosed, wherein in unused portions of a time channel a channel number and accompanying designator are stored and transmitted. Upon receipt and detection of the designator, the channel number is compared in a comparator with the current value of a channel counter which designates storage locations in a receiver storage. If a mismatch is found a synchronizing unit is energized causing the next succeeding channel number to be loaded in the channel counter, establishing synchronization. As a safety measure, successive comparisons are carried out in the comparator to ensure that not a single isolated comparative match was established.

5 Claims, 2 Drawing Figures

SYNCHRONIZING METHOD IN TIME-DIVISION MULTIPLEX TRANSMISSION SYSTEMS

FIELD OF THE INVENTION

The invention relates to a synchronizing method in time-division multiplex transmission systems using a transmitting storage at the transmitter exchange station and a receiver storage at the receiver exchange station, wherein the transmission and reception of units of information take place under the control of a timing bit available both at the transmitter exchange and at the receiver exchange and generated at a central point of the transmission system, and timing bit counters provided at the sending and receiving end can be stepped forward by means of said timing bit.

BACKGROUND OF THE INVENTION

With the increase of the data volume to be transmitted and the rise in the transmission speed, the time-division multiplex principle finds increasing use in transmission systems.

A major problem in time-division multiplex transmission systems is synchronization. The requisite conditions for synchronism in a time-division multiplex transmission system can be described through the concepts of bit synchronism, channel synchronism and frame synchronism. Hereinafter, bit synchronism is understood to mean that the sequence of the bits of information formed at the transmitter exchange, i.e., for instance, of a message indicating, for example, the modulation status of a line at the moment of scanning, is also maintained at the receiver exchange. Channel synchronism means that the individual bits of such a message are unambiguously allocated to one single time channel and not to one portion of a time channel n and to another portion of a time channel $n + 1$.

Also, the channel allocation must also be correct, that is to say, the individual bits of a message which are allocated to a particular time channel in the transmitter exchange must also be assigned to this time channel in the receiver exchange. This requirement is always met if frame synchronism is maintained.

To solve the above problems, it is well known in the art to make the timing bit generated in the transmission system available to the transmitter exchange as well as to the receiver exchange. By means of said timing bit a counter, hereinafter referred to as a bit counter, is stepped forward in the transmitter exchange and in the receiver exchange. In the transmitter exchange, the units of information, that is to say, the individual bits of the message are sent to the transmission line. A channel bit is generated wth each overflow of the bit counter in the transmitter exchange stepped forward through the timing bit, and a second counter, hereinafter referred to as channel counter, can be stepped forward by said channel bit. Thus, the instant at which one switches over from one time channel to the following time channel is established. This channel bit is sent to the receiver exchange over the transmission system and there it causes, on the one hand, the resetting of the bit counter at the receiving end and, on the other, the timely takeover of the bits of the message arriving over the particular time channel. The information concerning the frame synchronization can be simulated at the receiver exchange by counting the channel clock pulses of a regular channel bit in the channel counter at the receiving end and by evaluating an additional unit of information at the receiving end.

However, a requisite condition of the method described hereinabove is that the channel bit is available in the receiving exchange, that is to say, that it is transmitted over the transmission system. This requisite condition is, however, not always met. Therefore, it is an object of the invention to provide a synchronizing method in time-division multiplex transmissions systems without separate channel bit transmission by which, in particular during system changeover, or if the bit synchronism is lost as a result of a disturbance, unambiguous allocation is possible in the receiver exchange, with respect to the individual bits of a message, to the channel arrangement within a time-division multiplex frame and to the time-division multiplex frame itself

SUMMARY OF THE INVENTION

In accordance with the invention, the foregoing and other aspects are achieved in that for the channel synchronization in the receiver exchange a channel bit generated upon the overflow of the bit counter which counts the timing bit is fed to a word input register following the receiver register as well as to the channel counter. Their position is decoded in a channel decoder for selecting a storage location of the receiver storage provided for each channel. As further synchronizing information on free channel positions in time-division multiplex channels, the channel number of the particular time channel is transferred in conjunction with an additional designator. Through evaluation of the designator in the receiver exchange, the storing of the channel number transferred to the word input register in the receiver storage is blocked; this channel number is fed to a comparator circuit, in which the current channel number formed from the channel timing bit is compared with the transferred channel number, and, if there is at least one negative comparison, the bit sequence having the received timing bit is displaced, a synchronizing means is prepared, and the comparator circuit is disabled. Under the control of the synchronizing means the channel counter is then loaded with the next channel number received, and the comparator circuit is reconnected, synchronism thereby being established.

The main advantage of the method according to the invention resides in the fact that complete synchronization is possible even if no channel bit is transferred.

A channel number can always be transferred if the channel is not seized or if during the transmission of coded scan values no modulation change shall be transferred, which, in practice, occurs in more than 50 percent of all messages.

BRIEF DESCRIPTION OF THE DRAWINGS

The principles of the invention will be more readily understood by reference to the description of a preferred embodiment given hereinbelow in conjunction with the accompanying drawings.

Figure 1:
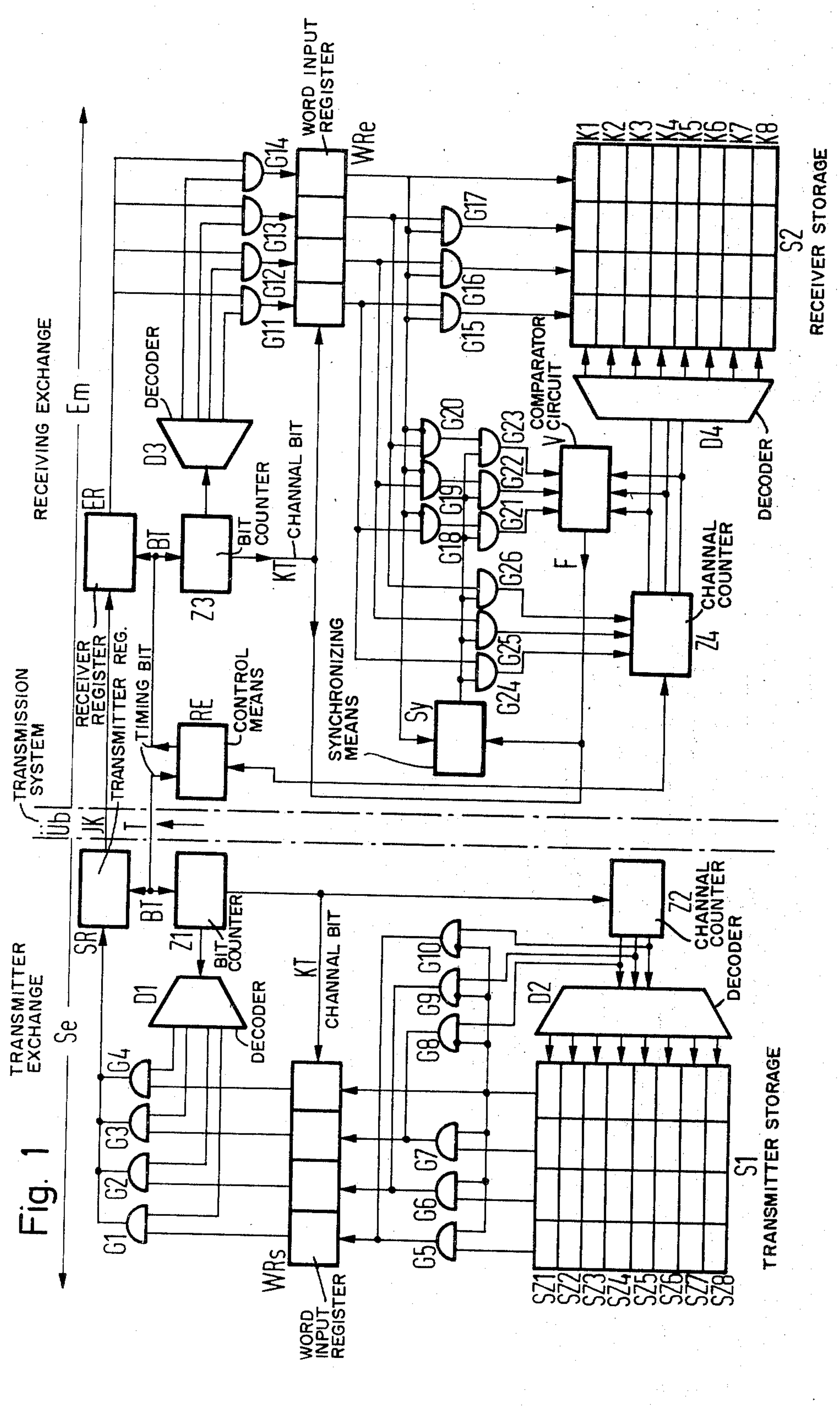
FIG. 1 is a schematic diagram of a time-division multiplex transmission system used in carrying out the disclosed method.

DESCRIPTION OF A PREFERRED EMBODIMENT:

FIG. 1 shows a transmitter exchange S*e* and a receiver exchange Em which are linked together over the time-division multiplex transmission system U*b*. Both the transmitter exchange and the receiver exchange are only shown with the details needed for understanding this invention. The transmitter exchange includes the transmitter storage S1, the word output register WR*s* and the transmitter register SR. The bit counter Z1 is provided to evaluate the timing bit; this bit counter controls the transmission of the individual bits of a message. The individual storage areas of the transmitter storage, hereinafter referred to as locations, can be selected over the channel counter Z2 and a channel decoder D2.

At the receiver end, there is also provided a storage, viz, the receiver storage S2, into which are written the bits of a message transferred from the receiver register ER to the word input register WR*e*. A bit counter Z3 and channel counter Z4 are provided, together with their corresponding decoders D3 and D4. There are further provided a comparator circuit V, a synchronizing means SY and a control means RE. The timing bit is marked BT and the channel bit is marked KT at both the sending end and the receiving end.

In the embodiment in FIG. 1, in which the time channel is subdivided into eight channels, each of the storage devices S1 and S2 contains eight locations SZ1 – SZ8 or K1 – K8 which are each assigned to one time channel. For clearer identification, it is assumed that each location can receive a 4-bit word, although in practice a message may contain more than four bits. How a message is produced is not the subject matter of the invention and, like the input of the individual bits of the message to the storage S1 or the output from the storage S2, it is not shown, such techniques being well known in the art. The transfer of the bits of a message from a location in the storage S1 to the word output register WR*s* takes place via the gates G5 to G7. The word output register WR*s* is connected with the input of the transmitter register SR via the gates G1 to G4, with the individual bits being sent over the transmitter register SR under the control of the timing bit BT, which is supplied as timing bit T from the transmission system to the information channel K. The timing bit BT is available as a counting bit, and it is also available for the bit counter Z1. The gates G1 to G4 are controlled during transmission in the rhythm of the timing bits over the bit decoder D1. The channel bit KT is generated with the overflow of the bit counter Z1, and is provided to the word register WR*s* at the transmitting end, thereby preparing the latter for the receipt of the next storage word. However, the channel bit KT also reaches the channel counter Z2, so that the position thereof indicates the channel number in question. The location in the storage S1 designated by the channel number and allocated to the time channel following in the time sequence pattern is selected by the channel decoder D2.

Since the operations described hereinabove take place in the same manner in the receiver exchange, the processes taking place therein are not discussed in detail.

According to the invention, each location SZ1 to SZ8 of the storage S1 contains an additional designator or identification signal indicating whether a unit of information to be transmitted is held in the particular location. For example, the additional designator can be formed during the preparation of the information to be transmitted. In this embodiment if a unit of information is to be sent out, the designator is entered as 1, and if no information is sent out, it is entered as 0 at a certain place in the corresponding location of the storage S1.

In the described embodiment, the last bit position of a location contains a 1 if a message is to be sent; it contains a 0 if the corresponding time channel is not seized or if no information is transferred at this instant. According to the invention, the channel number of the time channel allocated to this location is transferred. Hence, if the channel counter Z2 is in the position corresponding to the channel number KN2, the location SZ2 is selected over the channel decoder D2, the last position of which is provided with a 0. Thus, the gates G5 to G7 are blocked, while the gates G8 to G10 are open for the transfer of the channel number to the word output register WRs. The information about the channel number (channel number KN2 in the example) is then transferred to the receiver exchange Em in the same manner as the individual bits of a unit of information read out from the storage over the gates G1 to G4, the transmitter register SR, and the information channel JK.

The receiver exchange Em comprises the receiver register ER, the output of which is connected with the word register WR*e* at the receiving end over the gates G11 to G14. The bit T supplied by the transmission system is made available as timing bit BT to the receiver register ER as well as to the bit counter Z3. Through decoding in the bit decoder D3, the gates G11 to G14 are opened so that the received information, e.g., the bits of a message or of a channel number, arrrive at the word register WR*e*. With each overflow of the bit counter Z3, a channel bit KT is generated which is provided to the word register WR*e* as well as to the channel counter Z4. The channel decoder Dr is selected over the output of the channel counter Z4 over which, therefore, the current channel number is made available. The channel decoder D4, in turn, selects the individual locations SZ1 to SZ8 of the receiver storage S2. Assuming that the information received on a time channel is a message, so that the last bit position is consequently filled with a 1, the gates G15 to G17 are open and the received information is written into the corresponding location of the storage S2 addressed over the channel decoder D4.

If, however, the transferred information is a channel number, then a 0 is found in the last bit location of the incoming information. This leads to the blocking of the gates G15 to G17, but the gates G18 to G20 are open and offer at the outputs thereof the logic conbination corresponding to the transferred channel number. This channel number is fed to a comparaotr circuit V over the gates G21 to G23, which comparator circuit V receives the current channel number formed by the stepping forward of the channel counter Z4 in the receiver exchange. Where there is a negative comparison, a control pulse is transmitted to a control device RE over an error output F, in which control device RE thereupon a pattern displacement is cuased with respect to the received timing pulse T, and hence, a pattern displacement of the bit timing pulse BT offered in the receiver exchange.

However, at the same time (this will be discussed later in connection with the description of FIG. 2) the comparator circuit V is switched off and the synchronizing means SY is connected. As a result the gates G24 to G26 are prepared so that the next incoming channel number is connected through to the channel counter Z4. This means that the channel counter Z4 then stores the incoming channel number.

Figure 2:
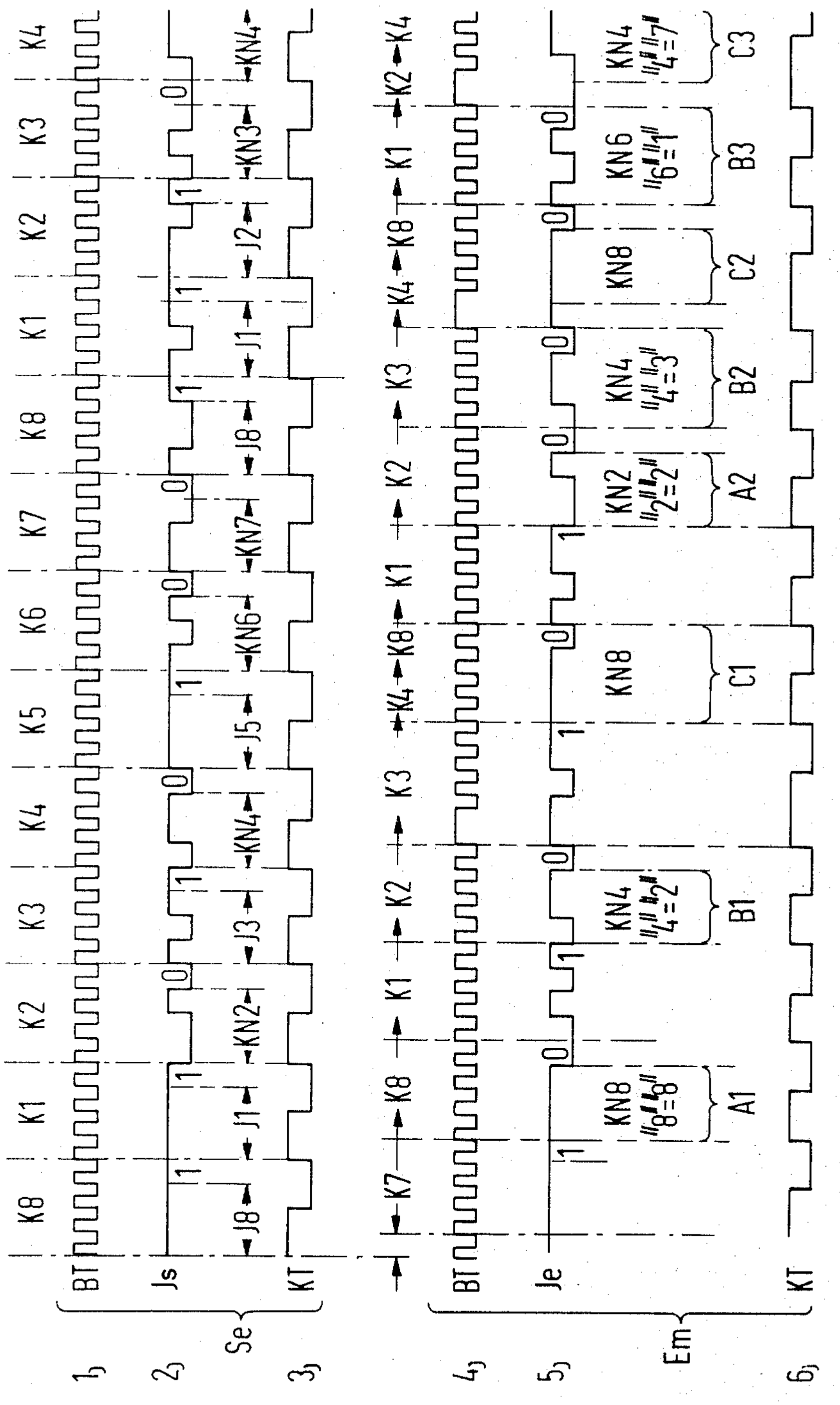
FIG. 2 is a pulse diagram showing a complete synchronizing process carried out according to a preferred embodiment of the invention, the pulse diagram being used for reference.

Now, referring to FIG. 2, the timing bit BT and the channel bit KT offered in the transmitter exchange Se or in the receiver exchange Em are shown at lines 1, 3 and 4, 6 respectively. In line 2 is shown the unit of information Is transmitted over the transmitter register SR in the transmitter exchange S*e*, and in line 5 the unit of information Ie received over the receiver register ER in the receiver exchange E*m*. Assume that as a result of an error (not specfied in detail herein), the receiver is shifted by one timing bit with respect to the transmitter. Let it further be assumed that the transmitter exchange at the starting moment of the presentation in FIG. 2 is adjusted to the time channel with the channel number KN8, but that the receiver exchange is adjusted to the time channel with the channel number KN7. In this connection, it is unimportant whether this status prevails during the cutover or whether the synchronism was lost due to a comparatively long disturbance in the transmission.

It is assumed that, where there is circulation in the transmitter exchange Se over the time channels K2, K4, K6 and K7, the channel numbers KN2, KN4, KN6 and KN7 allocated to said time channels are transmitted having a 0 in the last location of the unit of information, while the time channels K1, K3, K5 and K8 are seized for other units of information, that is to say, they are provided with a 1 in the last location thereof. In the receiver exchange, due to the shifting of the timing bit BT in the arrangement over the time channel K8, the combination 1 1 1 with a 0 is randomly received as information in the last location which is agreed upon as channel number KN8. This channel number is transferred to the comparator circuit V over the gates G18 to G20 and G21 to G23. In this case, the received channel number happens to agree with the current channel number (A1 in FIG. 2), so that no reaction is initiated in the receiver exchange. With the stepping forward of the channel counter Z4, a unit of information, the last bit of which represents a 1, is received in the receiver exchange, due to the unchanged timing bit BT, so that a reaction does not take place either.

The stepping forward of the channel counter Z4 to the time channel K2 now leads to the reception of a unit of information, the last bit of which is a 0 and which, therefore, is identified as a channel number. As a result of the random bit sequence 0 1 1, the channel number KN4 is identified and again offered to the comparator circuit V over the gate G18 to G20 and G21 to G23. This comparator circuit V indicates an error signal generation (B1 in FIG. 2) by a comparison with the current channel number corresponding to the position of the channel counter Z4. As a result, on the one hand, the bit sequence including the timing bit BT is shifted over the control means RE (line 4) and, on the other, the synchronizing means SY is prepared and the comparator circuit V blocked. After stepping forward of the channel counter Z4 to the time channel K3, a unit of information is received, the last bit of which is a 1, which therefore is not evaluated as a channel number. Only the next unit of information coming in on the time channel K4 after again stepping forward, the last bit of which is a 0, is identified as a channel number. The received bit sequence 1 1 1, agreed upon as channel number KN8, is loaded in the channel counter Z4 over the gates G24 to G26 prepared by the synchronizing means SY. The current position of the channel counter Z4 is thus changed from the channel number KN4 to the channel number KN8 (C1 in FIG. 2). The next channel bit now switches the channel counter Z4 to the time channel K1 over which a unit of information is received, the last bit of which is a 1. After stepping forward to the time channel K2, a unit of information is received which is again identified as a channel number, viz, as channel number KN2 and which therefore, since it ocrresponds to the current channel number KN2, does not lead to a reaction (A2 in FIG. 2). Now, it would be possible to consider the synchronizing process as terminated. However, to ensure that this is not just a random correspondence, a correspondence between the received channel number and the current channel number so established is followed by a further comparison process. If the channel counter Z4 is now stepped forward to the time channel K3, the received unit of information, viz. the bit sequence 0 1 1, is transmitted to the comparator circuit V as the channel number KN4, due to the 0 found in the last bit place, to which comparator circuit V the current channel number KN3 is offered simultaneously. Since the comparison terminates negatively, the pulse sequence shift of the timing bit described hereinabove is again initiated over the error output F via the control means RE, and the synchronizing means SY is activated (B2 in FIG. 2). The next unit of information received and identified as a channel number thus reaches the channel counter Z4 (C2 in FIG. 3) directly over the gates G24 to G26, and the comparator circuit is reconnected. Since in this case the channel number in question is the channel number KN8, the channel counter Z4 is switched to the time channel K1 with the next step forward thereof. The result is that the unit of information presently received, which is identified as channel number KN6 due to the bit sequence 1 0 1, again leads to a negative comparison (B3 in FIG. 2) in the comparator circuit V. The processes described hereinabove, viz, the shifting of the bit sequence BT over the control means RE, the connection of the synchronizing means SY and the disconnection of the comparator circuit V take place as described hereinabove. The next unit of information coming in and identified as a channel number is thus loaded in the channel counter Z4. This is the bit sequence 0 1 1 which is loaded in the channel counter Z4 as channel number KN4, so that the current position thereof really corresponds to the assigned position at the sending end (C3 in FIG. 2). In this way, full synchronization is achieved.

The method according to the invention can also be applied to those cases where units of information are transferred to a plurality of channels whose bit pattern in the last bit position has a 0, but which nevertheless must not be regarded as a channel number but as message information; for example, in the case of direct transmission of sequences of scan values or clock-controlled transmission of direct data bits. In this case, the status of the particular time channel must be known to the transmitter and to the receiver. This may, for example, be accomplished by writing at the same time into the transmitter storage the unit of information at the transmitter which characterizes the status, and by reading it during the ward transfer from the transmitter storage to the word output register at the transmitter or from the word input register to the receiver storage at the receiver. In dependence thereupon, the last bit of the message is then evaluated or not evaluated as an additional designator.

What we claim is:

1. A synchronism method in time-division transmission system having a transmitter storage at the transmitter exchange and a receiver storage at the receiver exchange, wherein the transmission and reception of units of information take place under the control of a timing bit provided both to the transmitter exchange and at the receiver exchange, by which bit counters provided at the sending and at the receiving exchanges can be stepped, comprising:

1. generating a timing bit in the transmission system and providing said bit to said bit counters at the transmitting and receiving exchanges,
2. generating a channel pulse upon overflow of the bit counter at the receiver exchange,
3. applying the channel pulse to a word input register whose output is connected to said receiver storage and to a channel counter coupled to said receiver storage for determining the current storage location seized in said receiver storage,
4. transferring from said transmitter exchange to said receiver exchange in free positions of said determined channel the channel number and a designator of said channel number to said word input register,
5. transferring said received channel number to a comparator circuit for comparison with the current channel number produced by said channel counter in response to said channel pulse to determine if synchronism is maintained, and blocking the path of said word input register to said receiver storage if synchronism is not maintained,
6. displacing said bit sequence including the received timing bit by one channel position,
7. loading the next channel number received by said word input register and identified by its accompanying designator directly into said channel counter so that the storage location determined by said channel counter coincides with the presently seized storage location.

2. The method as set forth in claim 1, wherein said transferring and comparing step is repeated to establish multiple successive correspondence between said received channel numbers and said current channel number designated by said channel counter.

3. The method as set forth in claim 1 further comprising writing a predetermined bit comprising said designator into a location of the transmitter storage assigned to a time channel, cyclically reading each location of said transmitter storage until said designator is reached, blocking further information output from said transmitter storage upon reaching of said designator and transferring said channel number together with said designator from said transmitter storage to a word output register for transmission to the receiver exchange.

4. The method as set forth in claim 2 further comprising writing a predetermined bit comprising said designator into a location of the transmitter storage assigned to a time chanel, cyclically reading each location of said transmitter storage until said designator is reached, clocking further information output from said transmitter storage upon reaching of said designator and transferring said channel number together with said designator from said transmitter storage to a word output register for transmission to the receiver exchange.

5. A method as claimed in claim 3 wherein said designator is always stored in an unused bit position of said time channel in a bit location accompanying a channel number.

* * * * *